Patented Sept. 5, 1922.

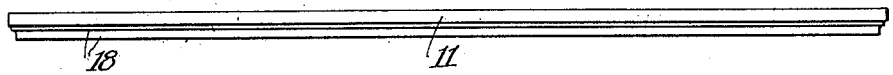
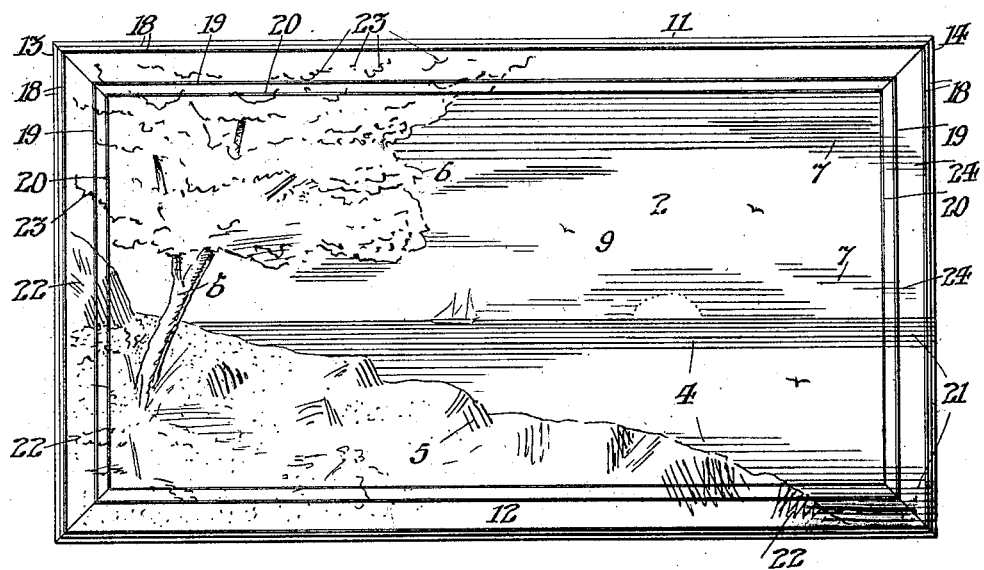
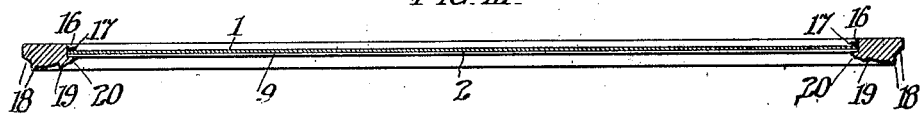

1,427,874

UNITED STATES PATENT OFFICE.

PAUL L. WEAVER, OF ALLENTOWN PENNSYLVANIA.

PICTURE FRAME.

Application filed November 30, 1921. Serial No. 518,975.

*To all whom it may concern:*

Be it known that I, PAUL L. WEAVER, a citizen of the United States, residing at Allentown, in the county of Lehigh and State of Pennsylvania, have invented a certain new and useful Improvement in Picture Frames, whereof the following is a specification, reference being had to the accompanying drawing.

As ordinarily constructed and arranged, picture frames are entirely distinct from the pictures which they are designed to support and protect. Such frames being usually so toned as to abruptly contrast with the tones of the picture, so that there is an abrupt demarcation at the junction of any picture with its frame. Moreover, it is the usual practice to emphasize the distinction between the frame and the picture by interposing a mat or border distinguishable from both. Such practice, has at least in part, been imposed by the commercial demands for frames of standard sizes which may be interchangeably applied to pictures of the same standard size, irrespective of the individual characteristics of such pictures and, of course, such procedure is economical. However, I have discovered that a more pleasing artistic effect may be produced by mounting a picture in a frame which blends with the picture by providing the frame with pictorial elements complementary to elements in the picture; so that every such frame has individual characteristics directly related to the picture which it supports and protects. Of course, the latter method of framing a picture is more costly than the ordinary commercial method aforesaid; but it is not the object of my invention to reduce the cost of mounting pictures. On the contrary, it is the object of my invention to provide a picture mounting of individual character and artistic quality superior to the more economical mountings aforesaid.

As hereinafter described, my invention is illustrated with reference to a picture upon a plane surface of an opaque rectangular panel. Said opaque panel, being covered by a plane transparent panel, consisting, for instance, of a glass plate, is supported in a frame including four, respective straight but rectangular joined, members forming a recess holding both said pannels. Each of said straight frame members is provided with shadow forming elements, including molding projections extending parallel with the edges of said panels, and pictorial elements extending on said frame members, over said shadow forming elements, and respectively complementary to said pictorial elements, on said plane surface of said opaque panel.

My invention includes the various novel features of construction and arrangement hereinafter more definitely specified.

In said drawing: Fig. I is a top edge view of a frame embodying my invention.

Fig. II is a front elevation of said frame, with the individual picture, to which said frame is complementary, mounted in said frame.

Fig. III is a longitudinal sectional view of said frame and picture and its appurtenances taken on line III, III in Fig. II.

In said figures; the rectangular panel 1 is of opaque material having a plane front surface 2 with pictorial elements on said surface, for instance, the ocean 4, shore 5, tree 6 and clouds 7. Said opaque panel 1 is covered by a plane transparent panel 9 which may be a plate of glass, celluloid or other suitable material. The frame includes the four, respectively straight but rectangularly joined, members 11, 12, 13 and 14, each of said members being rebated as indicated at 16 in Fig. III, forming a recess holding said panels, which may be retained therein by any suitable means such as the brads 17. Said frame is provided with shadow forming elements including molding projections 18, 19, and 20 extending parallel with the edges of said panels. The effect of said shadow forming elements is to distinguish the frame from the picture, regardless of the tones of either, by the chiara obscuro effect of said projections dominating the tones of the frame and picture. Said frame has pictorial elements extending on said frame members, over said shadow forming elements, as indicated respectively at 21, 22, 23 and 24, and respectively complementary to said pictorial elements 4, 5, 6 and 7 on said plane surface of said opaque panel.

Of course, the surface of the frame upon which said pictorial elements 21, 22, 23 and 24 extend is not plane, like the surface upon which said complementary pictorial elements 4, 5, 6 and 7 extend, but is irregular as indicated in Fig. III, being interrupted, by the shadow forming elements aforesaid, and the shadows formed thereby, which merge into the tones of said pictorial elements; with the effect that the frame, which is of opaque material, appears to be transparent or translucent with the picture showing through the shadows thereof.

Although the drawing aforesaid does not display any color; it is to be understood that the pictorial elements aforesaid may be colored; in which case, the adjoining areas of the opaque panel 1 and the frame may be similarly toned so as to blend with each other at the junction of the picture and the frame.

Although I have found it convenient to illustrate my invention with reference to a rectangular frame and plane picture; it is to be understood that it is equally applicable to other forms and configurations of both the frames and pictures.

Therefore, I do not desire to limit myself to the precise details of construction and arrangement herein set forth, as it is obvious that various modifications may be made therein, without departing from the essential features of my invention, as defined in the appended claims.

I claim:

1. The combination with an opaque rectangular panel, having a plane surface and pictorial elements on said plane surface; of a plane transparent panel, covering said opaque panel; a frame including four, respectively straight but rectangularly joined, members forming a recess holding said panels; shadow forming elements on said frame, including molding projections extending parallel with the edges of said panels; and pictorial elements extending on said frame members, over said shadow forming elements, and respectively complementary to said pictorial elements on said plane surface of said opaque panel.

2. The combination with an opaque panel, having a plane surface and pictorial elements on said plane surface; of a transparent panel, covering said opaque panel; a frame including members forming a recess holding said panels; shadow forming elements on said frame, including molding projections extending parallel with the edges of said panels; and pictorial elements extending on said frame members, over said shadow forming elements, and respectively complementary to said pictorial elements on said opaque panel.

3. The combination with a panel, having pictorial elements on its surface; of a frame including members forming a recess holding said panels; shadow forming elements on said frame, including molding projections; and pictorial elements extending on said frame members, over said shadow forming elements, and respectively complementary to said pictorial elements on said panel.

In testimony whereof, I have hereunto signed my name at Philadelphia, Pennsylvania, this sixth day of April, 1921.

PAUL L. WEAVER.

Witnesses:
ARTHUR E. PAIGE,
CAROLYN E. REUTER.